United States Patent [19]

Rösener et al.

[11] 4,394,454
[45] Jul. 19, 1983

[54] METHOD FOR MAKING SINTERED DOLOMITE WITH A LOW POROSITY AND A GOOD HYDRATION STABILITY

[75] Inventors: Karlheinz Rösener, Dusseldorf; Alfred Roeder, Duisburg; Wolfgang Münchberg, Hagen; Herbert Richrath, Hagen; Max Chmiel, Hagen, all of Fed. Rep. of Germany

[73] Assignee: Dolomitwerke GmbH, Wulfrath, Fed. Rep. of Germany

[21] Appl. No.: 342,449

[22] Filed: Jan. 25, 1982

[30] Foreign Application Priority Data

May 9, 1981 [DE] Fed. Rep. of Germany ....... 3118481

[51] Int. Cl.³ ............................................. C04B 35/04
[52] U.S. Cl. .................................. 501/112; 501/113; 501/123; 501/125
[58] Field of Search ................. 501/112, 113, 123, 125

[56] References Cited

U.S. PATENT DOCUMENTS 2,133,672 10/1938 Singewald ........................... 501/113

Primary Examiner—James Poer
Attorney, Agent, or Firm—Allison C. Collard; Thomas M. Galgano

[57] ABSTRACT

To produce a dolomite sinter with a low porosity and a good hydration stability made of difficult-to-sinter raw dolomite, the dolomite is milled and caustic burnt dolomite, dolomite hydrate or semi-burnt dolomite in quantities between 3 and 20% by weight relative to the total mixture is added to the raw dolomite powder and is calculated as oxide, as well as foreign oxide, such as $Fe_2O_3$, $Al_2O_3$ or $SiO_2$, in such quantities that the total content of the foreign oxide mixture is 1 to 3% by weight.

11 Claims, No Drawings

METHOD FOR MAKING SINTERED DOLOMITE WITH A LOW POROSITY AND A GOOD HYDRATION STABILITY

The present invention relates to a method for making sintered dolomite or dolomite sinter with a low porosity and a good hydration stability made of milled crude or raw dolomite. More particularly, it relates to a method of making sintered dolomite from pure raw dolomite with a low content of foreign oxides by adding further foreign oxides, pressing the milled raw dolomite into briquets and heating the briquets to sinter temperature.

Naturally, the dolomite stones or rocks have a certain impurity with changing foreign oxides, depending on the deposits. Sintered dolomite is best suited for making refractory materials if, on the one hand, it contains a low amount of impurities but, on the other hand, is very densely sintered, i.e., has a low pore volume. However, these two criterias are generally mutually exclusive, due to the technical, physical and chemical reasons.

Pure dolomite, especially silurian dolomite of the geological formations Guelph and Salina do not lend themselves to be sintered to a sufficiently low total porosity with the usual sinter temperatures. These dolomite stones have a foreign oxide content of less than 1% and have crystal sizes of more than 0.1 mm. In accordance with the present state of the art, it is assumed that these two criteria are mainly responsible for the poor sinter behavior. Easily sinterable raw dolomite has such a high content of foreign oxides that it is not suitable for making refractory materials. Measures for purifying such impure dolomite are expensive from the technical point of view and are very rarely used in practical application. Dolomite deposits, the dolomite stones of which can be easily sintered, whereby the sinter has good refractory characteristics and a sufficient hydration stability are rare.

Numerous past methods are known which have the object to improve the sinterability of poorly sinterable dolomite. These methods can be described as follows: the application of sintering temperatures above 2000° C. by using oxygen; enriching the pure dolomite with foreign oxides as an auxiliary sintering means; a so-called double sintering, i.e., making softly burnt dolomite, pressing the sintered dolomite into molded articles and effecting a subsequent sintering; and a combination of the aforementioned methods. However, all of these known methods require considerable expenses for the technical measures.

It is therefore an object of the invention to make a densely sintered dolomite sinter with a good hydration stability suitable for refractory or refraction purposes.

It is a further object of the invention to press dolomite into briquets in a very simple technical method during only one single sintering process, in particular, from difficult-to-sinter dolomite stone of the aforementioned type.

Surprisingly, it has been found that this object of the invention can be obtained by adding caustic burnt or calcined dolomite, dolomite hydrate or semi-burnt dolomite in quantities between 3 and 20% by weight, relative to the total mixture, to the raw dolomite powder, such that the total foreign oxide content, such as $Fe_2O_3$, $Al_2O_3$ or $SiO_2$ is 1 to 3% by weight, calculated on the annealing or ignition loss-free mixture.

It is already known to press raw dolomite powder and subsequently sinter this material, and to carry out the corresponding method with burnt dolomite, whereby in accordance with both methods, sintering auxiliary means may be added. However, it has been shown that under comparable conditions, a dolomite sinter is neither obtained from raw dolomite alone, nor from burnt dolomite alone, after pressing and sintering, which has such a low total porosity as provided in accordance with the subject invention. This effect was also observed when sintering auxiliary means are added in low quantities under comparable conditions. Generally, the total porosities were lowest in the range of between 3 and 20% by weight addition of burnt dolomite. The total porosity increased during the introduction of lower or higher additions of burnt dolomite to the raw dolomite. This effect is not explainable in accordance with today's knowledge. It was not obtainable by the sole addition of foreign oxides, even at increased quantities.

The invention is further seen in a series of advantageous method steps and variations. The preferred range for the addition of burnt dolomite to the raw dolomite powder is between 5 and 10% by weight. The lowest porosities are obtained in the sinter with an addition in this range. Instead of adding burnt dolomite, one can add, with almost the same success, semi-burnt dolomite or dolomite hydrate. These additions may be recovered, by means of known methods, from the same raw dolomite of which the raw dolomite powder consists of, but may also originate from lesser pure deposits. Thereby, care should be taken that the foreign oxide content, i.e., the impurities, does not exceed 3% by weight, relative to the sinter to be obtained.

In accordance with the inventive method, the sintering and, in particular the hydration stability, is improved by adding foreign oxides. Preferably $Fe_2O_3$, $Al_2O_3$ and $SiO_2$ is used in such quantities that their total quantity is 1 to 3% by weight, preferably 1.5 to 2.5% by weight, relative to the total impurities of foreign oxides in the finished sinter. Especially successful were the following foreign oxide contents in the sinter: iron oxide 0.8%, aluminum oxide 0.5%, and silica 0.8%. The aforementioned weight ratio of the added foreign oxides with respect to each other has also been successful in cases when the contents of total impurities is adjusted either higher or lower. These additions which facilitate sintering and which at the same time also improve the hydration stability can be selected from technical or commercially-available iron oxide, red mud, bauxite, iron rich clay, or the like, and which can be added to the finely divided raw dolomite powder. However, they should have low amounts of alkalines or halides. They may also be added to the mixture in the form of correspondingly impure raw dolomite.

The hydration stability is substantially determined by the foreign oxide content. For example, it was found that comparable press cylinders with the measurements of 50 mm cross section and 50 mm height with a usual granular structure were destroyed during storage at 30° C. and 95% relative humidity, when the test cylinders had reached an additional weight of about 2%.

These additions in weight occurred even only after five days storage with a sinter having a foreign oxide content of 0.54% by weight and only after eight days with a sinter having a foreign oxide content of 1.06% by weight. If the sinter contains 2.1% by weight of foreign oxides, the storage time can be lengthened to fourteen days under the aforementioned conditions. For these reasons, a sinter with a foreign oxide content of 1 to 2.5% by weight is particularly advantageous.

The granular sizes of the milled raw dolomite (CaMg(CO$_3$)$_2$) and also the additions of burnt dolomite (CaO+MgO) or partly burnt dolomite (CaCO$_3$+MgO) should advantageously be less than 1 mm and, preferably, larger than 0.1 mm. When pressing the mixture into briquets, pressures of 2 t/cm$^2$ and, preferably, 3 t/cm$^2$ are advantageous, so as to obtain raw densities of the burnt briquets of about 2 g/cm$^3$. At any rate, a high raw or crude density is advantageous.

For sintering the briquets, a normal sintering temperature of between 1600° C. and 2000° C. is recommendable and sufficient. As is known, a more dense sinter is obtained by applying higher temperatures and longer sintering times.

All components of the mixture should be present in an even distribution before pressing, i.e., as an intimate mixture. The forming into briquets may be carried out with the usual briquet rollers. The burning and sintering process may be carried out in a rotating pipe furnace but also in a shaft furnace, when heating with solid combustion material, for example, coal dust. Thereby, ash components of the coal are absorbed by the material to be sintered further reducing the porosity of the sinter and forming a so-called sinter skin on the briquets. The quantity of the impurities from the solid combustion material absorbed by the sinter has to be taken into consideration when adjusting the foreign oxide content.

The invention will now be explained by way of several examples which are given by way of illustration and not of limitation.

TEST EXAMPLES

The results obtained in numerous tests are complied in the following table:

size of 5 mm to 16 mm were sintered. The foreign oxide contents are also stated in % by weight. In addition to the foreign oxides SiO$_2$, Fe$_2$O$_3$ and Al$_2$O$_3$, other foreign oxides were partially present in low quantities. The foreign oxide content in the test series 2–7, 9–14 and 17–22 were always the same. The statements relate to the annealing or ignition loss-free mixture, or to the recovered sinter, respectively. The raw density and the porosity values were defined in accordance with DIN 51065 (1).

| | Analysis of the raw dolomite: | | | |
|---|---|---|---|---|
| Dolomite type | A | B | C | D |
| loss on ignition | 47.29 | 47.44 | 47.45 | 47.45 |
| SiO$_2$ | 0.14 | 0.14 | 0.17 | 0.11 |
| Fe$_2$O$_3$ | 0.28 | 0.11 | 0.07 | 0.06 |
| Al$_2$O$_3$ | 0.07 | 0.05 | 0.04 | 0.02 |
| MnO | 0.09 | 0.01 | 0.01 | 0.01 |
| CaO | 31.37 | 31.29 | 31.33 | 31.58 |
| MgO | 20.76 | 20.96 | 20.93 | 20.77 |

The test series 1–8 of the table were conducted without any addition of foreign oxide. In the test series 9–22, foreign oxides were added in such quantities to the dolomite types B, C and D, such that a foreign oxide content was obtained as stated in the table.

DETAILS OF THE TEST PERFORMANCE (1) Crude dolomite powder:

For recovering the raw dolomite powder, fine gravel of the corresponding dolomite types were milled in a ball mill to a granular size of 100% by weight smaller than 0.1 mm. The portion of the powder in granular sizes below 0.045 mm was more than 80% by weight.

(2) Caustic burnt dolomite:

Fine gravel from the corresponding dolomite type

| Dolomite type | Raw or crude dolomite powder | Caustic burnt dolomite | Foreign oxide content | | | | Raw density g/cm$^3$ | Total porosity vol. % |
|---|---|---|---|---|---|---|---|---|
| | | | Total content | SiO$_2$ | Fe$_2$O$_3$ | Al$_2$O$_3$ | | |
| 1 A | Fine gravel 5/16 | | 1.04 | 0.27 | 0.51 | 0.15 | 3.26 | 4.7 |
| 2 A | 0 | 100 | 1.04 | 0.27 | 0.51 | 0.15 | 3.19 | 6.7 |
| 3 A | 50 | 50 | | | | | 3.21 | 6.1 |
| 4 A | 75 | 25 | | | | | 3.24 | 5.3 |
| 5 A | 90 | 10 | | | | | 3.32 | 2.9 |
| 6 A | 95 | 5 | | | | | 3.32 | 2.9 |
| 7 A | 100 | 0 | | | | | 3.29 | 3.8 |
| 8 B | Fine gravel 5/16 | | 0.59 | 0.27 | 0.21 | 0.1 | 3.02 | 11.7 |
| 9 B | 0 | 100 | 2.12 | 0.80 | 0.80 | 0.50 | 3.04 | 11.1 |
| 10 B | 50 | 50 | | | | | 3.08 | 9.9 |
| 11 B | 75 | 25 | | | | | 3.21 | 6.1 |
| 12 B | 90 | 10 | | | | | 3.24 | 5.3 |
| 13 B | 95 | 5 | | | | | 3.24 | 5.3 |
| 14 B | 100 | 0 | | | | | 3.17 | 7.3 |
| 15 B | 100 | 0 | 2.65 | 0.82 | 1.31 | 0.5 | 3.18 | 7.0 |
| 16 B | 100 | 0 | 3.0 | 0.26 | 0.21 | 2.54 | 3.11 | 9.1 |
| 17 C | 100 | 0 | 2.12 | 0.80 | 0.80 | 0.50 | 3.00 | 12.3 |
| 18 C | 90 | 10 | | | | | 3.24 | 5.3 |
| 19 C | 0 | 100 | | | | | 3.06 | 10.5 |
| 20 D | 100 | 0 | | | | | 3.11 | 9.1 |
| 21 D | 90 | 10 | | | | | 3.23 | 5.6 |
| 22 D | 0 | 100 | | | | | 3.05 | 10.8 |

The letters A, B, C and D in the table designate different, mostly difficult-to-sinter raw dolomite for which the analysis are stated further below. In the corresponding columns for raw dolomite powder and caustic burnt or sintered dolomite the quantity amounts are stated in % by weight, with the exception of test series 1 and 8, wherein for the matter of comparison, fine gravel in the was milled and burned ignition or annealing loss free at 1000° C.

(3) Foreign oxide additions:

Used were: Quartz powder in a granular size of 87% by weight smaller than 0.06 mm, red iron oxide with a granular size of 99% by weight smaller than 0.04 mm, and aluminum oxide with a granular size of 91% by weight smaller than 0.125 mm.

(4) Making of the admixtures:

For making the mixtures, the foreign oxides were pre-mixed with a third of the dolomite mixture and thereafter the remainder of the dolomite portion was admixed thereto.

(5) Making of the briquet:

Cylindrical briquets were made with a cross section of 50 mm and a height of 28 mm by pressing the mixture at a pressure of 3 t/cm².

(6) Burning of the briquets:

The burning took place at 2000° C. for 8 hours. The cooling took place in the open air.

What is claimed is:

1. In a method for making a dolomite sinter with a low porosity and a good hydration stability made of milled raw dolomite comprising the steps of adding foreign oxides to milled pure raw dolomite powder having a low content of foreign oxides, pressing the milled raw dolomite powder-foreign oxide admixture into briquets, and heating the briquets to a sintering temperature, the improvement comprising:

adding a member selected from the group consisting of burnt dolomite, dolomite hydrate, semi-burnt dolomite and combinations thereof in quantities of between 3 and 20% by weight, relative to the total mixture, to said raw dolomite powder and wherein said foreign oxides are added in such quantities such that the total content of foreign oxides is 1 to 3% by weight calculated on the ignition loss free mixture.

2. The method according to claim 1, wherein said foreign oxide added includes $Fe_2O_3$, $Al_2O_3$ and $SiO_2$.

3. The method according to claim 1, wherein said member selected from the group consisting of caustic burnt dolomite, dolomite hydrate, semi-burnt dolomite and combinations thereof is admixed with raw dolomite powder in quantities of between 5-10% by weight.

4. The method according to claim 1 or 2, wherein said foreign oxides are added to the admixture in such quantities that the total content of the foreign oxides in the mixture is 1.5 to 2.5% by weight.

5. The method according to claim 2, wherein the content of $Fe_2O_3$ is 0.8% by weight, $Al_2O_3$ is 0.5% by weight and $SiO_2$ is 0.8% by weight in the admixture.

6. The method according to claim 1, wherein said admixture to be pressed consists of granular sizes of less than 0.1 mm.

7. The method according to claim 1, wherein said mixture to be pressed consists of granular sizes of more than 1 mm.

8. The method according to claim 1, wherein the sintering temperature is 1600° to 2000° C.

9. The method according to claim 1, wherein the pressing of the mixture is carried out with pressures of more than 2 t/cm².

10. The method according to claim 1, wherein the sintering of the molded article is carried out by using solid combustion material for sintering.

11. The method according to claim 10, wherein said solid combustion material is coal dust.

* * * * *